3,313,091
VACUUM CYCLE ADSORPTION
Norton H. Berlin, Matawan, N.J., assignor to Esso Research and Engineering Company, a corporation of Delaware
Filed Nov. 4, 1963, Ser. No. 321,272
6 Claims. (Cl. 55—58)

This application is a continuation-in-part of application Ser. No. 298,647 filed July 30, 1963 and now U.S. Patent 3,280,536 in the name of Norton H. Berlin, which is herein incorporated by reference.

This invention relates to apparatus, processes and techniques for separating components of gaseous mixtures from each other. In particular, the invention relates to the separation of oxygen from nitrogen. More particularly, the invention relates to the separation of oxygen and nitrogen of the air to produce a nitrogen-enriched stream and an oxygen-enriched stream, which streams can be used for various purposes. The invention is particularly adapted to the production of relatively dry oxygen-enriched air streams suitable for controlling the environment within closed areas utilizing an adsorption technique employing a vacuum cycle.

One use of the invention is in the control of gaseous environments within enclosed areas including not only closed or enclosed areas which are suitable for habitation of human beings but also those for animal life, as well as plant and microscopic life. The invention also can be used to control environments within enclosed areas which are used to store food, flowers and other perishable items.

The invention is an improvement over the heatless adsorption technique taught in U.S. 2,944,627 issued to C. W. Skarstrom which is herein incorporated by reference. In general, heatless adsorption is characterized by adsorption and desorption lengths of relatively short duration so that the heat of adsorption is conserved and used as a driving force to aid in desorption. Generally, a complete cycle consisting of both adsorption and desorption phases will be from 5 to 300, preferably 40 to 150 and, most preferably, about 60 to 120 seconds.

Preferably there is a bed pressure equalization step between the adsorption and desorption phases of the cycle when two or more adsorbent vessels are used together. Where the process is carried out with a single vessel, bed pressure equalization (BPE) may be eliminated. A typical cycle schedule where two adsorbent vessels are used is presented in Table VI. BPE times can be from 1 second to as long as desired consonant with the overall cycle. Generally, it will be from 1 to 20, preferably 3 to 12, and most preferably, 3 to 8 seconds.

While adsorption pressures can be as high as desired for $O_2/N_2$ separations from atmospheric air, there is no real advantage in using adsorption pressures much above atmospheric. A suitable adsorption pressure range is 15 to 120, preferably 15 to 50 and, most preferably, 15 to 20 p.s.i.a. For desorption a pressure as low as 0 mm. of Hg could be used if conveniently obtainable. A suitable desorption pressure would be from 0.1 to 750, preferably 50 to 400 and, most preferably, 100 to 200 mm. of Hg absolute.

A particular aspect of the invention relates to the application of vacuum desorption in an adsorption process where certain components are adsorbed on an adsorbent and the adsorbent is periodically regenerated so that it is suitable for further adsorption by desorption of the adsorbent. The art teaches many ways of desorbing an adsorbent but in this invention vacuum desorption is the particular preferred technique. By vacuum desorption is meant any pressure below atmospheric pressure.

Although for the purpose of describing a specific embodiment of the invention, a vacuum desorption is described with respect to a strontium substituted 13X molecular sieve. It is to be understood that the principles described herein are applicable to any adsorbent where the component to be removed by desorption shows a sharp rising isotherm in the region below atmospheric pressure. The component to be enriched should have an isotherm slope which is both lower than a desorbed component and is either essentially linear or concave upward.

The molecular sieves which can be used in the process of the invention include, in general, the Type X and Type A molecular sieves which have about 30 to 100%, preferably 60 to 100 and, most preferably, 75 to 98% of their sodium cations replaced by divalent Group II metal cations or monovalent silver cations. Directionally, the greater the amount of substitution the better the capacity. Preferably, the Group II metal cations are $Mg^{++}$, $Ca^{++}$, $Sr^{++}$, and $Ba^{++}$.

For the Type X sieve $Ca^{++}$, $Sr^{++}$, and $Ag^+$ are more preferred while $Sr^{++}$ and $Ca^{++}$ are especially preferred and $Sr^{++}$ is most preferred. For the Type A sieve, $Ca^{++}$, $Mg^{++}$, $Sr^{++}$ and $Ag^+$ cations are more preferred.

The preferred temperature of operation for $O_2/N_2$ separations from air is about 35° F. to 100° F. since, at temperatures below 35° F., the freezing of water vapor in air presents a problem. Even more preferably, the temperature of operation is 45 to 80° F. and, most preferably, 57 to 77° F. However, temperatures of from about −10° F. to 110° F. could be used.

One of the advantages of the process of the invention in producing $O_2$-enriched air is that when ordinary air containing water vapor is used as feed, most of the water vapor is also removed resulting in a relatively dry $O_2$-enriched air.

Adsorbent regeneration is accomplished by bed depressuring followed by product purging. Preferred purge-to-feed (P/F) ratios fall in the range of 0.2 to 2.0 with 0.5 to 1.5 especially preferred, and 0.7 to 1.0 most preferred. P/F is defined as the volume of purge to the volume of feed at the respective conditions in the adsorption zone.

In a specific preferred embodiment of the invention, a process and apparatus are described which greatly facilitate the attainment of controlled oxygen-enriched atmospheres within an enclosed area. This aspect is especially suitable for those who need $O_2$ for medical treatment. It is to be understood, however, that the gases obtained by the separation process of the invention can be used for a wide variety of industrial purposes as will be obvious to one skilled in the art.

Customarily, persons suffering from such pulmonary disorders as emphysema, congestive heart failure, and the like, require up to 50% oxygen in the gas they breathe, usually in the range of about 30–40% oxygen. This compares with an oxygen content of approximately 21% in air. The patient who requires the increased oxygen content in his air has to be either confined in an oxygen tent or has to use a portable oxygen breathing device both of which are connected to oxygen tanks.

Although pure bottled oxygen has been used to enrich a room directly, e.g. at Columbia Presbyterian Medical Center, it has not been very satisfactory. It is very expensive, requires extensive manipulation, and presents an extreme fire and explosion danger if flames should flare back onto the bottle or cylinder. Moreover, the bottles or cylinders must be constantly maintained, adjusted, and eventually replaced. The process and apparatus of the invention are far superior in all the respects mentioned as well as in many others for supplying $O_2$-enriched air directly to an enclosure such as a room for a patient's use.

The process and apparatus of the invention, besides having human utility, has other uses. For instance, the activity of domestic animals can be regulated for maximum productivity by using adsorption techniques to suitably adjust the oxygen-nitrogen ratio in a barn or other structure for animal habitation.

In U.S. Patent 3,280,536, a process was described for obtaining oxygen-enriched air by the heatless adsorption process. This process involved the use of an apparatus with an adsorption cycle ranging from 30 p.s.i.g. to 0 p.s.i.g. using a 5A molecular sieve as an adsorbent. This is referred to hereinafter as the conventional cycle.

The conventional cycle process in the copending application for oxygen enrichment gives oxygen product purities of 30 to 40% in a net oxygen product of about 150 cc. of oxygen per 100 grams of adsorbent at 70° F. These results for this type of cycle are typical for commercially available molecular sieves such as 13X, 5A and 10X when used in a 30 p.s.i.g. adsorption-0 p.s.i.g. desorption cycle with air feed.

Studies were subsequently made to evaluate various adsorbents for their capacity for nitrogen. As a starting point in these studies various molecular sieves having either an X framework or an A framework and having primarily the sodium ion as a cation were evaluated by substituting other cations in place of the sodium. After substitution of these other cations, the capacity for nitrogen and oxygen of these adsorbents was determined. The results are summarized in Table I which follows:

adsorption cycle of 3 p.s.i.g. to 30 p.s.i.g. at 70° F. See Table II which follows:

TABLE II

| Sieve | 3 p.s.i.g. to 30 p.s.i.g. Cycle at 70° F. | |
|---|---|---|
| | Net $O_2$ Product* | Product Purity, Percent $O_2$ |
| 5A | 122 | 32 |
| 13X | 104 | 31 |
| 10X | 85 | 30 |
| X-Sr | 98 | 31 |

*Cc.'s at STP/100 gms. of sieve.

Actually the 13X strontium (X-Sr) molecular sieve is somewhat inferior to some of the other molecular sieve adsorbents tested. It is almost the lowest in terms of net oxygen product, and in terms of product purity it is no better than the 13X (sodium form) molecular sieve and somewhat inferior to the 5A (calcium form) molecular sieve.

The essence of the invention resides in the fact that a technique was discovered which utilizes the strontium X sieve and the other preferred sieves of the invention in an extremely effective manner. Thus, it was found that by the use of a vacuum cycle, the high capacities of the strontium X (X-Sr) sieve could be utilized. It is to be emphasized that using the strontium X sieve in a conventional manner resulted in no more than average re-

TABLE I.—SUMMARY OF $N_2$ AND $O_2$ ISOTHERMS FOR MOLECULAR SIEVES (70° F.)

| | Capacities, Gms. of Gas/100 Gms. of Sieve | | | | | | | | | | | | | |
|---|---|---|---|---|---|---|---|---|---|---|---|---|---|
| | Li | Na | K | Cs | Mg | Ca | Sr | Ba | Cd | Ni | Co | Zn | Pb | Ag |
| "X" Framework: | | | | | | | | | | | | | | |
| $N_2$ at— | | | | | | | | | | | | | | |
| 5 p.s.i.g. | 0.88 | 1.20 | 0.68 | 0.50 | 0.85 | 2.02 | 2.22 | 1.34 | 0.92 | 0.75 | 0.69 | 0.50 | 0.29 | 1.68 |
| 15 p.s.i.g. | 1.36 | 1.70 | 0.96 | 0.75 | 1.16 | 2.36 | 2.78 | 1.79 | 1.23 | 1.10 | 0.95 | 0.79 | 0.45 | 1.97 |
| 30 p.s.i.g. | 1.98 | 2.40 | 1.45 | 1.13 | 1.66 | 2.80 | 3.33 | 2.44 | 1.63 | 1.59 | 1.40 | 1.18 | 0.73 | 2.40 |
| $O_2$ at— | | | | | | | | | | | | | | |
| 5 p.s.i.g. | 0.43 | 0.47 | 0.40 | 0.42 | 0.40 | 0.76 | 0.73 | 0.64 | 0.39 | 0.38 | 0.35 | 0.34 | 0.27 | 0.47 |
| 15 p.s.i.g. | 0.67 | 0.73 | 0.59 | 0.61 | 0.61 | 1.08 | 1.15 | 1.01 | 0.58 | 0.60 | 0.57 | 0.59 | 0.40 | 0.79 |
| 30 p.s.i.g. | 1.07 | 1.17 | 0.96 | 0.97 | 0.97 | 1.56 | 1.72 | 1.50 | 0.90 | 0.96 | 0.86 | 0.91 | 0.61 | 1.20 |
| "A" Framework: | | | | | | | | | | | | | | |
| $N_2$ at— | | | | | | | | | | | | | | |
| 5 p.s.i.g. | 0.86 | 1.15 | Nil | | 1.95 | 1.93 | 1.72 | Nil | | | | 0.60 | | 2.30 |
| 15 p.s.i.g. | 1.28 | 1.60 | Nil | | 2.41 | 2.57 | 2.24 | Nil | | | | 0.88 | | 2.64 |
| 30 p.s.i.g. | 1.83 | 2.21 | Nil | | 3.04 | 3.24 | 2.85 | Nil | | | | 1.24 | | 2.95 |
| $O_2$ at— | | | | | | | | | | | | | | |
| 5 p.s.i.g. | 0.46 | 0.47 | Nil | | 0.62 | 0.74 | 0.63 | Nil | | | | 0.48 | | 0.62 |
| 15 p.s.i.g. | 0.68 | 0.70 | Nil | | 0.94 | 1.12 | 0.92 | Nil | | | | 0.70 | | 0.94 |
| 30 p.s.i.g. | 1.08 | 1.10 | Nil | | 1.47 | 1.65 | 1.42 | Nil | | | | 1.09 | | 1.33 |
| Cation Properties: | | | | | | | | | | | | | | |
| Mole Wt. | 6.94 | 23.0 | 39.1 | 132.9 | 24.3 | 40.1 | 87.6 | 137.4 | 112.4 | 58.7 | 58.9 | 65.4 | 207.2 | 107.9 |
| Ionic Radius | 0.78 | 0.98 | 1.33 | 1.65 | 0.78 | 1.06 | 1.27 | 1.43 | 1.03 | 0.78 | 0.82 | 0.83 | | 1.13 |
| Polarizability | 0.2 | 0.5 | 2.2 | 6.3 | 0.3 | 1.4 | 2.3 | 4.3 | 2.4 | 0.3 | 0.3 | 0.3 | | >3.0 |
| Periodic Group No. | IA | IA | IA | IA | IIA | IIA | IIA | IIA | IIB | VIII | VIII | IIB | IVA | IB |

The results show that of all the cations tested, both mono and divalent, the strontium divalent cation in X-type sieves gave the highest capacity for nitrogen and, therefore, could be considered to have the necessary properties for greatest interaction with the nitrogen gas molecule.

It will also be noted from Table I that the Barium A sieve has no $N_2$ or $O_2$ capacity at all. The Barium X sieve is similar to 13X (sodium form) for $N_2$ capacity but the $O_2$ capacity of Ba X is higher than 13X which indicates poor results for $O_2/N_2$ separations. 13X sieves are known to be inferior to Sr sieves. The Ca X sieve is almost as good as the Sr X sieve.

This strontium X molecular sieve, which was produced from the commercial 13X molecular sieve by strontium chloride exchange, was evaluated with various molecular sieve adsorbents in an adsorption cycle of about 0 to 30 p.s.i.g. Contrary to what would have been expected, the strontium-substituted 13X sieve performed quite similarly to the 13X sieve under the specific conditions of an sults. The extraordinary results produced by the process of the invention were quite unexpected and not at all predictable until the invention was actually made. The invention described herewith teaches that adsorbent capacity alone, as illustrated by the isotherms, is not a measure of the adsorbents' ability to effect a separation of components. In contrast, it is the relative shape and slope of component isotherms which define the region where adsorption and desorption pressures must be chosen for optimum separation of components.

The conventional heatless adsorption cycle for oxygen production employs an adsorption step at high pressure, e.g., 30 to 50 p.s.i.g., and a desorption step at atmospheric pressure. The desorption step consists of a depressure step to 0 p.s.i.g. for example, followed by a purge step at atmospheric pressure. In this conventional cycle, a compressor is required to repressure the beds for the adsorption step. The vacuum cycle of the invention, on the other hand, does not require a compressor since the adsorbent beds are repressured with air at atmospheric pressure. A simple blower used for the feed step produces the desired oxygen rich product. The desorption step, however, requires a vacuum pump or aspirator for the bed depressure and purge steps.

The attractiveness of the vacuum cycle depends on the selection of the appropriate operating conditions required for a practical working cycle. Since the limiting feature is the vacuum pump, a moderate vacuum of 200 mm. Hg or 3.9 p.s.i.a. was selected as a reasonable desorption pressure for low cost commercial vacuum pumps. As a reasonable starting off place, conditions selected for the study were as follows:

| | |
|---|---|
| Temperature ° F | 90 |
| Adsorption pressure p.s.i.g. | 0 |
| Desorption pressure mm. Hg | 200 |
| Purge/feed ratio | 0.7 |

The invention can be fully understood from the following description and the foregoing description read with reference to the accompanying drawings in which.

Figure 1:
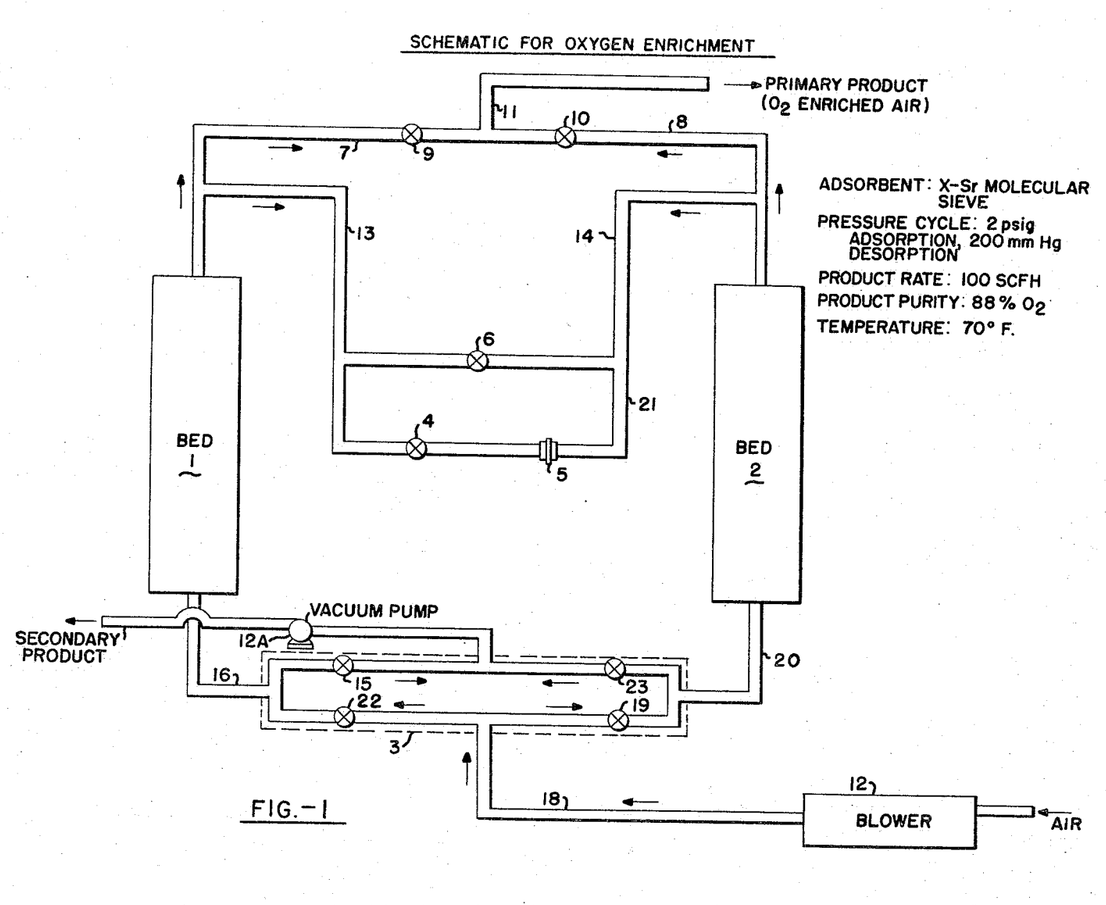
FIGURE 1 is a schematic illustration of a specific embodiment of the oxygen unit of the invention.

With reference to FIGURE 1, the operation of the unit is as follows. Bed 1 and bed 2 are connected at the feed end by a four-way, five-ported "Versa" valve 3, and at the top by purge valve 4 and purge orifice 5, as well as by bed pressure equalization (BPE) valve 6. Primary product, i.e., enriched $O_2$, is taken from beds 1 and 2 through lines 7 and 8 check valves 9 and 10 through product line 11. Blower 12 provides the pressure head to supply atmospheric pressure air to the adsorbent beds through Versa valve 3.

Starting at the bed pressure equalization step in the cycle schedule, bed 1 is on BPE and bed 2 is on BPE, which means that BPE valve 6 is open permitting free communication between bed 1 and bed 2 through lines 13 and 14. The pressure in bed 1 is reduced from essentially atmospheric pressure to about 500 mm. Hg and the pressure within bed 2 is raised from 200 mm. Hg p.s.i.g. to about 500 mm. Hg. At the next stage in the cycle, port 15 opens to allow the pressure in bed 1 to be reduced from 500 mm. Hg to 200 mm. Hg with vacuum pump 12a pulling adsorbed materials through line 16, port 15 and out through line 17. At the same time bed 2 is repressured with atmospheric air through line 18 into Versa valve 3 through port 19 and through line 20 into bed 2. So as bed 1 is depressured from 500 mm. Hg to 200 mm. Hg, bed 2 is being repressured from 500 mm. Hg to 0 p.s.i.g. During the vacuum and repressure steps in the cycle, BPE valve 6 and purge valve 4 are closed. In the next phase of the cycle, atmospheric air is forced through line 18, port 19, line 20, into adsorbent bed 2 by blower 12. During this part of the cycle, purge valve 4 is opened to allow a portion of primary product from bed 2 to flow through line 14, line 21 through purge orifice 5, valve 4, line 13 and into bed 1 where it passes through bed 1 picking up adsorbed constituents, and is pulled through line 16, port 15, and out through vent 17 to the vacuum pump. At the same time primary product from bed 2 is flowing in line 8, valve 10, and out through line 11.

At the end of this phase of the cycle, purge valve 4 is closed, BPE valve 6 is opened and the flow of atmospheric air through line 18 is halted by closing port 19 as well as port 15. Bed 1 goes from a pressure of 200 mm. Hg to about 500 mm. Hg and bed 2 goes from a pressure of 0 p.s.i.g. to about 500 mm. Hg. The flow of atmospheric air is recommenced through line 18 into "Versa" valve 3, through port 22, line 16, and into bed 1, BPE valve 6 and purge valve 4 being closed. This causes the pressure in bed 1 to build up from about 500 mm. Hg to 0 p.s.i.g. At the same time a vacuum is pulled on bed 2 with pump 12a which allows adsorbed constituents to exit through line 20 into "Versa" valve 3, through port 23, and out through line 17.

When the pressure in bed 1 reaches 0 p.s.i.g., product comes out off bed 1, through line 7, valve 9, and is recovered through line 11. At the same time purge valve 4 is opened allowing a portion of product to be pulled through line 13, purge valve 4, line 21 and line 14 into bed 2 to carry the balance of adsorbed constituents through line 20 into port 23 and out through vent line 17. At the conclusion of this phase of the cycle, bed 1 is at a pressure of 0 p.s.i.g. and bed 2 is at a pressure of 200 mm. Hg.

The invention is further illustrated by the following examples. For all these examples a batch of strontium X sieve was prepared for study by conventional batch ion-exchange procedures using commercial Linde 13X (sodium form of X framework) molecular sieves and strontium chloride solutions. The amount of strontium exchange with the 13X sieve was about 85 to 95% substitution for sodium cations.

Example 1

Figure 2:
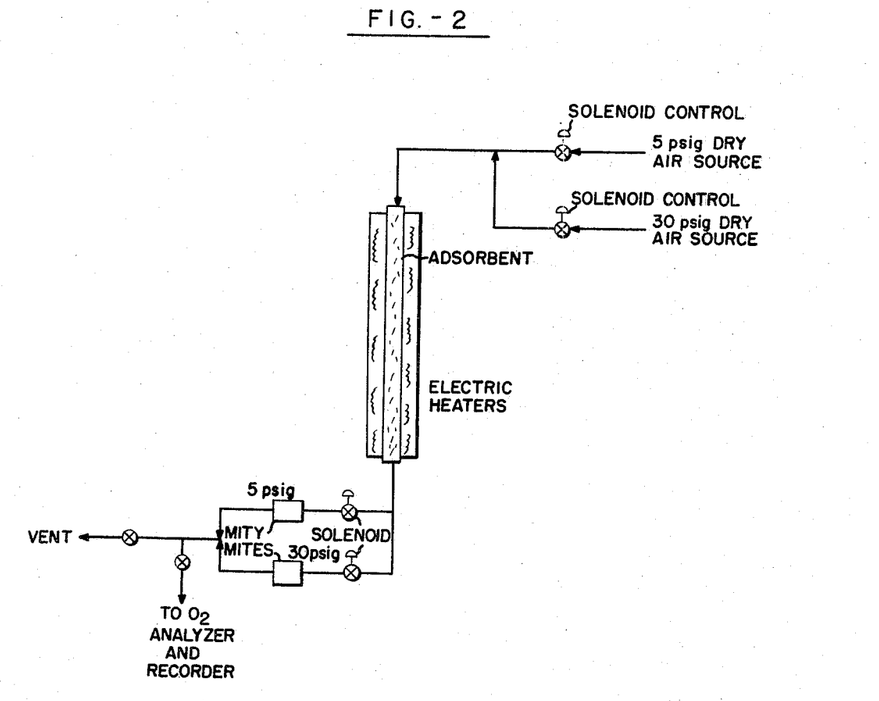
FIGURE 2 is a schematic illustration of experimental apparatus used to evaluate some of the various adsorbents and process conditions wherein net $O_2$ capacities were measured.

In some of these examples the pressure pulse adsorbent screening unit of FIGURE 2 was used to evaluate the vacuum cycle concept. This apparatus pressures up an adsorbent bed initially equilibrated with flowing air at low pressure to some higher pressure.

The experimental procedure was as follows. The adsorbent to be tested was activated by heating to 600° F. for two hours while purging with dry helium. The reactor was cooled to 70° F. and purged with dried air. The pressure was held constant at 5 p.s.i.g. with a back pressure regulator keeping a constant effluent flow rate. The $O_2$ concentration was monitored by an oxygen analyzer on effluent. The inlet pressure was suddenly increased to 30 p.s.i.g. on both inlet and back pressure regulator. This was accomplished with electric solenoid valves and parallel operated back pressure regulators at 5 and 30 p.s.i.g. After reaching air composition again, the pressure was suddenly reduced back to 5 p.s.i.g. The above pressure cycling was repeated at consistent time intervals.

The resulting $O_2$ pulse curve is a good qualitative picture of the adsorbents' quality for effecting an oxygen-nitrogen separation. The area under the pulse curve above the air feed composition (21% oxygen) is a quantitative measure of the nitrogen working capacity or net oxygen producing capacity and is expressed as XS oxygen or net O′ product (cc.'s at S.T.P./100 gms. of adsorbent). Typical results for this example illustrating both pressure and vacuum cycles are summarized in Table III which follows: (See also FIGURE 3.)

TABLE III

| | X-Sr [1] Vac. Cycle | Conventional [2] Cycle |
|---|---|---|
| XS $O_2$ at 70° F | 240 | 120 |
| Peak $O_2$ Purity, Vol. Percent $O_2$ | 87 | 31 |

[1] 3 mm. Hg to 2 p.s.i.g.
[2] 0 to 30 p.s.i.g. 5A sieve.

Figure 3:
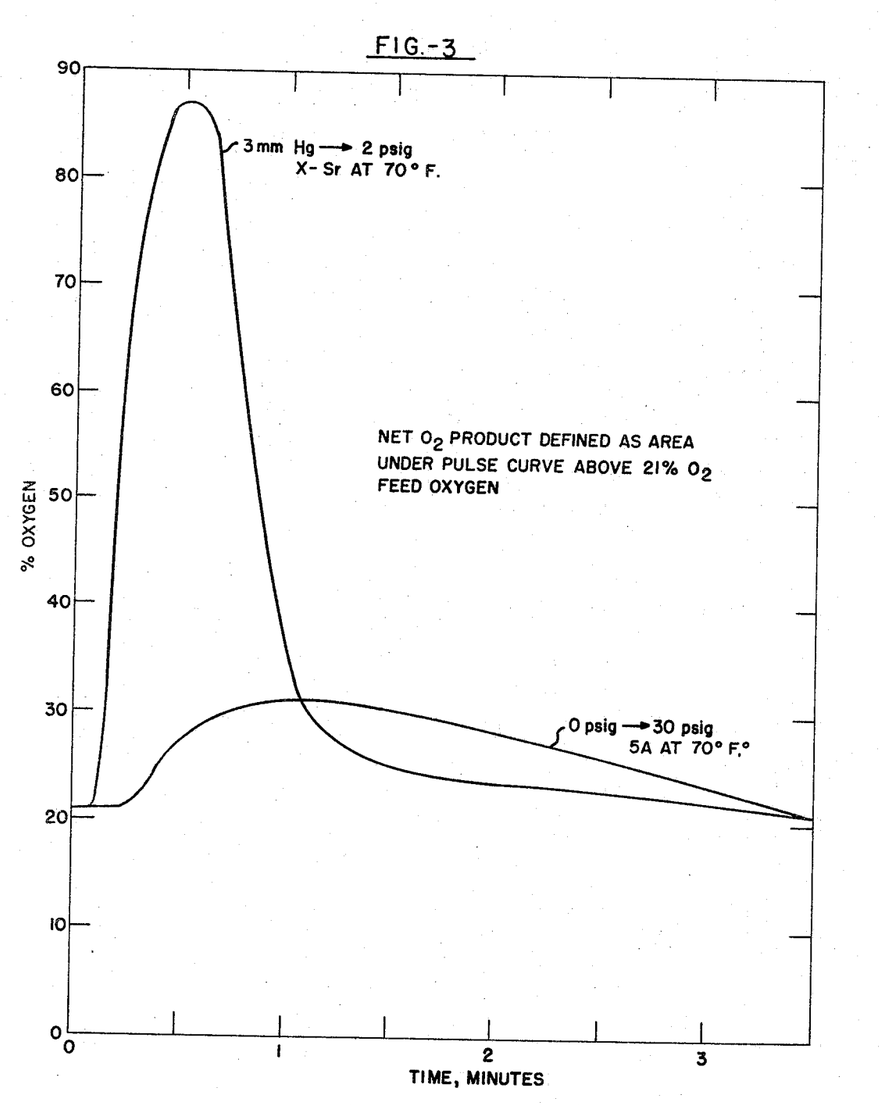
FIGURE 3 is a plot showing pressure pulse results on the experimental apparatus of FIGURE 2 with respect to different molecular sieves.
Figure 4:
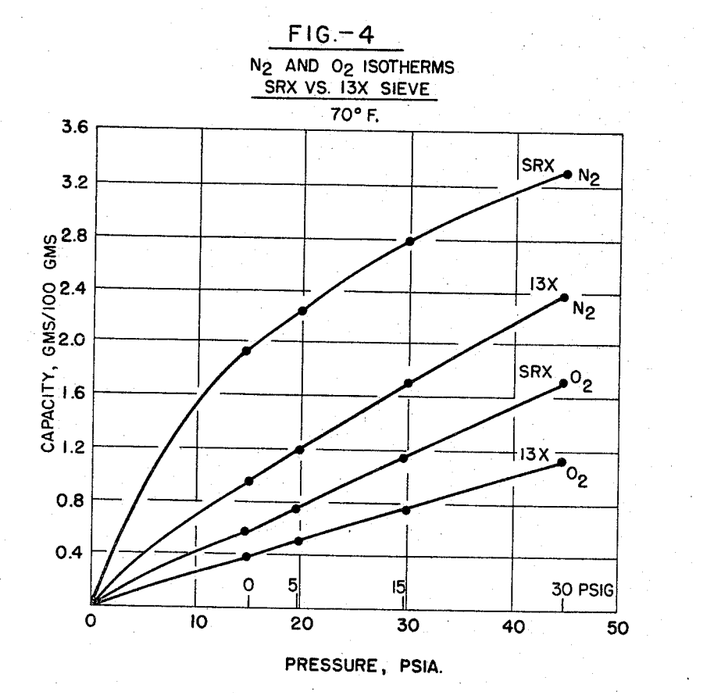
FIGURE 4 is a plot showing various nitrogen and oxygen isotherms on various sieves.
Figure 5:
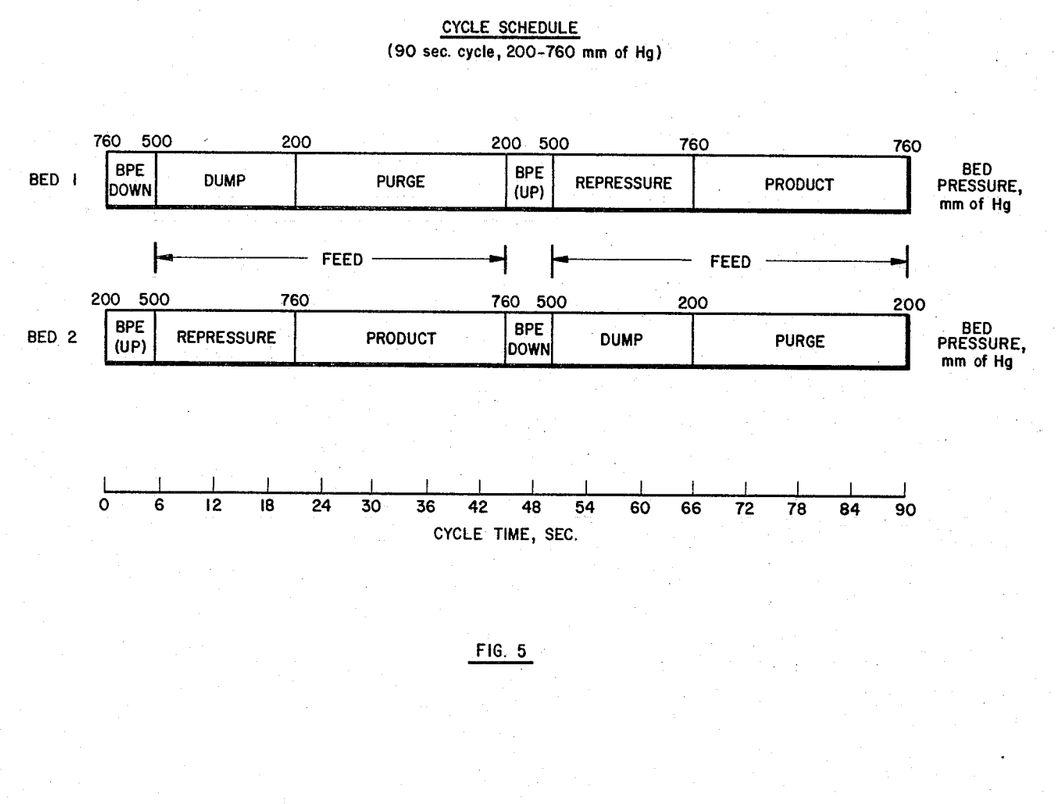
FIGURE 5 is a diagram of a typical cycle schedule and is self-explanatory.

The large area under the pulse curve (XS $O_2$), substantially higher peak $O_2$ purity, and the sharp adsorption front all illustrated in the FIGURE 3 plot demonstrate the marked advantages of the strontium X vacuum cycle of the invention.

*Example 2.—(Run in an apparatus similar to the one illustrated in FIGURE 1)*

A strontium X vacuum cycle using a 90-second cycle was run as well as a 5A sieve conventional cycle in order to compare the strontium vacuum cycle with the 5A conventional cycle. The product purity was set for both cycles as 72% $O_2$. In this case the X-Sr vacuum cycle was operated with a 5 p.s.i.g. adsorption pressure to facilitate collection and monitoring of the enriched $O_2$ product. The results are summarized in Table IV which follows:

TABLE IV

|  | X-Sr Vac. Cycle | 5A* Conv. Cycle |
| --- | --- | --- |
| Pressure Range | 200 mm. Hg/5 p.s.i.g. | 0 p.s.i.g./30 p.s.i.g. |
| Cycle Length, Sec | 90 | 90. |
| Product Purity, Percent $O_2$ | 72 | 72. |
| Prod. Rate, SCFH/lb | 1.06 | Ca. 0.8. |
| Recovery, Percent $O_2$ | 56 | 41. |

*Estimated from conventional $O_2$ unit results.

From the above Table IV, it can be seen that the strontium X vacuum cycle increases oxygen product rates and recoveries at least 30% over the conventional cycle.

It should be noted that dry air feed and longer (5 foot) beds were used in the X-Sr pilot unit study and contributed somewhat to the more favorable results. The conventional cycle results were obtained with 39″ beds and wet air feed. However, it appears that even with these effects taken into account, the X-Sr vacuum cycle will still offer about a 30% advantage. This conclusion is, in part, based on the very sharp adsorption fronts found with the vacuum cycle which tend to minimize the effect of bed length and water.

*Example 3*

The effect of cycle length was further explored in the X-Sr screening unit similarly illustrated in FIGURE 1 by comparing product rates and recoveries for both a 90-second and a 500-second cycle. The product purity was held at about 72% $O_2$ while measuring both product and feed rates. The results showed that the product rate of 1.06 s.c.f.h./lb. for the 90-second cycle was reduced to 2.08 s.c.f.h./lb. for the longer 500-second cycle. The product rates were in essentially the same proportion as the cycle length. The results are summarized below in Table V.

TABLE V

| Cycle Length | 90 Sec. | 500 Sec. |
| --- | --- | --- |
| Product Purity, Percent $O_2$ | 72 | 73 |
| Product Rate, SCFH/lb | 1.06 | 0.208 |
| Percent $O_2$ Recovery | 56 | 72 |

The cycle length showed a marked effect on $O_2$ recovery. The $O_2$ recovery increased from 56% $O_2$ for 90 seconds to 72% $O_2$ for 500 seconds. The large increase in oxygen recovery for the longer cycle is thought to be a result of two factors. First, the longer cycle improves utilization of the adsorbent bed by reducing mass transfer zone effects usually adversely affected by high velocities associated with fast cycling. Second, the longer cycle permitted smoother unit operation.

*Example 4*

For study purposes, a comparison was made of unit designs similar to that illustrated in FIG. 1 for the X-Sr vacuum cycle and the conventional cycle for a unit producing 100 s.c.f.h. at 60% $O_2$. This is a flow rate and purity which can be used for medical purposes to enrich an entire room at 40% $O_2$ and provide adequate ventilation for one sedentary, adult room occupant. Three cases considered for the X-Sr vacuum cycle were 0 p.s.i.g. to 200 mm. Hg, 0 p.s.i.g. to 100 mm. Hg, and 5 p.s.i.g. to 200 mm. Hg. The results showed that the X-Sr vacuum cycle had at least a 10% advantage over the conventional 0 to 30 p.s.i.g. cycle with the 5A sieve. This advantage applies to both the feed rate requirement and the amount of adsorbent. The results are summarized below in Table VI.

TABLE VI

Design Basis:
  100 SCFH Product Rate.
  60% $O_2$ Product Purity.
  39″ Bed Length.

| Cycle Schedule: | Seconds |
| --- | --- |
| Feed | 25 |
| BPE | 5 |
| Depressure, Purge | 40 |
| BPE | 5 |
| Repressure | 15 |
| Total | 90 |

| Case No. | Adsorption Pressure (p.s.i.g.) | Desorption Pressure (mm.) | Bed Size (lb.) | Bed Size (Diam., in.) | Blower (SCFH) | Vacuum Pump (SCFH) | Purge Time (Sec.) |
| --- | --- | --- | --- | --- | --- | --- | --- |
| I | 0 | 200 | 83 | 7.4 | 540 | 380 | 15 |
| II | 5 | 200 | 72 | 6.9 | 575 | 420 | 10 |
| III | 0 | 100 | 72 | 6.9 | 560 | 420 | 7 |
| IV [1] | 30 | 760 | 93 | 7.7 | [2] 590 |  | 25 |

[1] Conventional cycle using 5A sieve.
[2] Compressor required for conventional cycle.

In addition to the above it should be observed that the added flexibility of the strontium X vacuum cycle will permit operation at oxygen purities above 60%. For example, production of 72% oxygen would further reduce the feed rate required to 450 s.c.f.h. and the quantity of adsorbent to 70 lbs. for a strontium X cycle of 0 p.s.i.g. to 200 mm. Hg cycle. These results particularly emphasize the advantage of the strontium X vacuum cycle for production of oxygen-rich atmospheres. In addition, the vacuum cycle will permit the substitution of a simpler and relatively lower cost, smaller vacuum pump package in place of a compressor.

*Example 6*

The X-Sr vacuum cycle pilot unit studies conducted in a pilot unit similar to the one illustrated in FIG. 1, were extended to production of high purity $O_2$. A product purity of 93% $O_2$ was obtained with a product rate of 0.525 s.c.f.h./lb. of adsorbent and a high recovery of 53% $O_2$. The observed $O_2$ ceiling was 93% $O_2$ with $N_2$ <0.1%. The remaining gas was about 7% argon.

These results show that an essentially $N_2$-free product can be obtained with this type of cycle. This high purity $O_2$ product can serve as a feed for further purification by an argon removal process.

Recent adsorbent screening studies have indicated that significant diffusion rate differences exist between argon and $O_2$ with 4A molecular sieve. This suggests development of techniques for an argon/$O_2$ separation process employing 4A molecular sieves or diffusion barriers such as microporous Vycor glass or a newly developed Du Pont Teflon FEP-fluorocarbon film.

*Example 7*

In this example, production of 55 to 58% $O_2$ was accompanied by a 90% $N_2$ depressure gas at a rate of 0.68 s.c.f.h./lb. of adsorbent. This was measured with the 500-second cycle. For a 90-second cycle, the $N_2$ rate could be as high as 3.77 s.c.f.h./lb. Higher $N_2$ purities can be obtained by operating at lower pressures or by rejecting some of the front portion of the depressure gas. Other techniques such as low purity $N_2$ product recycle during the BPE step can be employed to improve $N_2$ purity.

In sum, the vacuum desorption cycle offers significant advantages over a conventional cycle which employs 5A sieves at high pressure. The strontium X cycle with vacuum can increase oxygen production by as much as 30% over the conventional cycle. In addition, oxygen product purities as high as 93% can be reached. Moreover, an additional nitrogen product with purities greater than 90% can be produced with the vacuum cycle employing X-Sr sieves.

With the benefit of the foregoing results obtained with the strontium X sieve, inferences can be made on the basis of observations with respect to the slopes of both the nitrogen and oxygen isotherms. Although the nitrogen and oxygen capacities are exceptionally high for a strontium X sieve, relative to the sodium 13X or the 5A sieve, which is the calcium form of the 4A sodium sieve, the strontium X nitrogen isotherm starts to flatten out above 0 p.s.i.g., while the oxygen isotherm is essentially linear and continues to rise. The overall result using a pressure cycle is a low net oxygen product and oxygen product purity level. The shape of the nitrogen isotherm for strontium X led to a heatless adsorption cycle operated in a lower pressure region where the slope is greatest relative to the oxygen slope. This was the fundamental discovery of the invention. When the 13X sodium sieve is used in the vacuum cycle the results are poorer than for the strontium X molecular sieve.

Although the invention has been described with some degree of particularity, it will be understood that variations and modifications can be made therein without departing from the spirit of the invention as hereinafter claimed. For instance, with a dry air source the product purge step can be completely eliminated. The separation is simply effected with just a pressure-vacuum cycle.

What is claimed is:

1. A method of obtaining oxygen-enriched air which comprises introducing air into a zone filled with a type X molecular sieve having 30 to 100% of its normal sodium cation replaced by $Sr^{++}$ cation at a temperature of $-10°$ F. to $110°$ F. and a pressure which is at least atmospheric, thereby preferentially adsorbing nitrogen, removing from said zone as a primary effluent stream oxygen-enriched air containing 25 to 93% oxygen, therefore desorbing adsorbed nitrogen from said molecular sieve in said zone by depressuring the zone to a subatmospheric pressure in the range of 0.1 to 750 mm. of mercury absolute, and purging said sieve at said subatmospheric pressure for desorption of adsorbed nitrogen with a portion of said primary effluent stream.

2. The process of claim 1 wherein both adsorption and desorption are conducted at a temperature in the range of $35°$ F. to $100°$ F.

3. The process of claim 1 wherein said adsorption step is conducted to maintain an oxygen level of 25 to 93% in the primary effluent oxygen-enriched air stream recovered from the adsorption step.

4. A method according to claim 1 wherein two adsorption zones are utilized wherein one zone is on adsorption cycle and the other zone is on desorption cycle and wherein at the end of each adsorption cycle and desorption cycle the two zones are connected so as to equalize the pressure therebetween, wherein a portion of oxygen-enriched air is used as a purge for a zone after it has been evacuated by depressuring to the lowest pressure in the range of 50 to 400 mm. Hg absolute of the cycle and wherein a zone that has been subjected to pressure equalization is repressuring for adsorption with atmospheric air to at least atmospheric pressure.

5. A method according to claim 4 wherein the total cycle schedule is 90 seconds, the rate of enriched oxygen is about 100 s.c.f./hr., the purity of said enriched oxygen is about 60% oxygen, and wherein the adsorption time is approximately 25 seconds, the bed pressure equalization time is approximately 5 seconds, the combination of depressure and purge time is about 40 seconds, and the repressuring time is about 15 seconds.

6. A method of obtaining relatively dry, oxygen-enriched air which comprises introducing atmospheric air into a zone filled with a type X molecular sieve having 30 to 100% of its sodium cation replaced by $Sr^{++}$ cation at a temperature of $35°$ F. to $100°$ F. and at a pressure in the range of of 15 to 50 p.s.i.a. for preferential adsorption of nitrogen by the sieve, obtaining from said zone as a primary effluent stream oxygen-enriched air containing 25 to 93% oxygen, desorbing adsorbed nitrogen from said molecular sieve in said zone by depressuring the zone to a subatmospheric pressure in the range of 50 to 400 mm. Hg absolute and purging said sieve at said subatmospheric pressure for desorption of the nitrogen at a temperature in the range of $35°$ F. to $100°$ F.

References Cited by the Examiner

UNITED STATES PATENTS

| | | | |
|---|---|---|---|
| 2,882,243 | 4/1959 | Milton | 55—75 X |
| 2,882,244 | 4/1959 | Milton | 55—75 X |
| 2,944,627 | 7/1960 | Skarstrom | 55—62 |
| 3,085,379 | 4/1963 | Kiyonaga et al. | 55—58 X |
| 3,086,339 | 4/1963 | Skarstrom et al. | 55—62 X |
| 3,237,377 | 3/1966 | Skarstrom | 55—58 X |

REUBEN FRIEDMAN, *Primary Examiner.*

C. HART, *Assistant Examiner.*

UNITED STATES PATENT OFFICE
CERTIFICATE OF CORRECTION

Patent No. 3,313,091                           April 11, 1967

Norton H. Berlin

It is hereby certified that error appears in the above numbered patent requiring correction and that the said Letters Patent should read as corrected below.

Column 10, line 5, for "therefore" read -- thereafter --.

Signed and sealed this 7th day of November 1967.

(SEAL)
Attest:

Edward M. Fletcher, Jr.                          EDWARD J. BRENNER
Attesting Officer                                 Commissioner of Patents